(12) United States Patent
Tu

(10) Patent No.: US 10,670,811 B2
(45) Date of Patent: Jun. 2, 2020

(54) MICRORING RESONATOR CONTROL METHOD AND APPARATUS

(71) Applicant: HUAWEI TECHNOLOGIES CO., LTD., Shenzhen (CN)

(72) Inventor: Xin Tu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/382,206

(22) Filed: Apr. 12, 2019

(65) Prior Publication Data

US 2019/0235172 A1 Aug. 1, 2019

Related U.S. Application Data

(63) Continuation of application No. PCT/CN2017/084037, filed on May 12, 2017.

(30) Foreign Application Priority Data

Oct. 14, 2016 (CN) .......................... 2016 1 0898337

(51) Int. Cl.
*G02B 6/26* (2006.01)
*G02B 6/293* (2006.01)
(Continued)

(52) U.S. Cl.
CPC ..... *G02B 6/29338* (2013.01); *G02B 6/29341* (2013.01); *G02B 6/29395* (2013.01);
(Continued)

(58) Field of Classification Search
None
See application file for complete search history.

(56) References Cited

U.S. PATENT DOCUMENTS 7,616,850 B1 11/2009 Watts et al.
7,796,262 B1* 9/2010 Wang ................. G01N 21/7746
356/436
(Continued)

FOREIGN PATENT DOCUMENTS

CN 101046531 A 10/2007
CN 101552648 A 10/2009
(Continued)

OTHER PUBLICATIONS

Nourhan Eid et al, Wide FSR Silicon-on-Insulator Microring Resonator with Bent Couplers. 2015 IEEE, 2 pages.

*Primary Examiner* — Jennifer Doan
(74) *Attorney, Agent, or Firm* — Kilpatrick Townsend & Stockton LLP

(57) ABSTRACT

Embodiments of the present invention relate to a microring resonator control method and apparatus. The method includes: receiving an instruction, where the instruction is used to configure an operating wavelength of a microring resonator; determining whether the operating wavelength of the microring resonator is less than or equal to a center wavelength of a channel spectrum; and when the operating wavelength of the microring resonator is less than or equal to the center wavelength of the channel spectrum, configuring thermode power of the microring resonator based on a spacing between the operating wavelength and a first wavelength; or when the operating wavelength of the microring resonator is greater than the center wavelength of the channel spectrum, configuring thermode power of the microring resonator based on a spacing between the operating wavelength and a second wavelength.

16 Claims, 10 Drawing Sheets

(51) Int. Cl.
*H04J 14/02* (2006.01)
*G02B 6/12* (2006.01)

(52) U.S. Cl.
CPC .......... *H04J 14/02* (2013.01); *H04J 14/0227* (2013.01); *G02B 6/12007* (2013.01); *G02B 2006/12083* (2013.01)

(56) References Cited

U.S. PATENT DOCUMENTS

| | | |
|---|---|---|
| 8,452,185 B2 | 5/2013 | Little et al. |
| 8,582,937 B2 * | 11/2013 | Xu .......................... G02F 1/025 385/50 |
| 9,438,970 B2 * | 9/2016 | Jones ................. G02B 6/12019 |
| 2002/0039470 A1 | 4/2002 | Braun et al. |
| 2009/0161113 A1 | 6/2009 | Chen et al. |
| 2012/0207479 A1 | 8/2012 | Krishnamoorthy et al. |
| 2015/0132015 A1 | 5/2015 | Hayakawa |

FOREIGN PATENT DOCUMENTS

| | | |
|---|---|---|
| CN | 103904555 A | 7/2014 |
| CN | 103955147 A | 7/2014 |
| CN | 104253655 A | 12/2014 |
| CN | 105651400 A | 6/2016 |
| WO | 2004088373 A1 | 10/2004 |
| WO | 2015001421 A2 | 1/2015 |

\* cited by examiner

MICRORING RESONATOR CONTROL METHOD AND APPARATUS

CROSS-REFERENCE TO RELATED APPLICATIONS

This application is a continuation of International Application No. PCT/CN2017/084037, filed on May 12, 2017, which claims priority to Chinese Patent Application No. 201610898337.8, filed on Oct. 14, 2016. The disclosures of the aforementioned applications are hereby incorporated by reference in their entireties.

TECHNICAL FIELD

The present invention relates to the optical communications field, and in particular, to a microring resonator control method and apparatus.

BACKGROUND

As a dense wavelength division multiplexing (DWDM) technology is applied in an optical fiber communications system and a data center system, all-optical switching has become a trend for meeting an increasing bandwidth. In a dense wavelength division multiplexing system, different optical wavelengths carry different optical signals, and optical signals of different wavelengths are transmitted in a same optical fiber, so as to implement large-capacity and low-loss data communication. An optical switch is a key component for implementing an all-optical switching system, and can implement functions such as route selection, wavelength selection, optical cross-connect, and self-healing protection at an all-optical layer. Currently, implemented optical switches include a conventional optical switch of a mechanical structure, a micro-electro-mechanical system switch, a liquid crystal optical switch, a waveguide optical switch, and a semiconductor optical amplifier optical switch. The waveguide optical switch is usually prepared on a silicon on insulator (SOI) platform or an indium phosphide (InP) platform by using a mature complementary metal-oxide-semiconductor (CMOS) technology, and a switching speed can reach an order of nanoseconds or microseconds by using a thermo-optical effect or a plasma dispersion effect of a silicon material. In addition, the waveguide optical switch has a small size and high integration, and is compatible with the CMOS technology, so that low-cost mass production can be implemented. A waveguide microring resonator is a wavelength-sensitive selective conduction device, has advantages of a compact structure, high integration, low power consumption, a simple design, and the like, and can be used to implement functions such as filtering, multiplexing, demultiplexing, routing, wavelength conversion, optical modulation, and optical switching. When a wavelength division multiplexing optical signal passes through a microring resonator, if a wavelength of the optical signal conforms to a resonant wavelength of the microring resonator, the optical signal is coupled to the microring resonator to generate resonance, so as to implement a routing function of an optical signal of a specified wavelength. Compared with a silicon-based optical switch matrix of a cascaded Mach Zehnder interferometer (MZI) type, an optical switch array consisting of a microring resonator has a simple topology structure, a few of stages, and has wavelength selectivity. Therefore, an optical signal passing through a wavelength is not affected by coupling of the microring resonator, and a pass-through insertion loss is very low. Particularly, in a metropolitan aggregation ring of a metropolitan optical network, an optical switch of a microring resonator type has both a filter function and signal uploading and downloading function, so that a switching node device is simple and efficient. For ease of description, the microring resonator is referred to as a microring for short on some occasions.

A dynamic wavelength division multiplexing technology is key in a future optical network. In a wavelength division multiplexing system, wavelengths of channels are different, and need to be controlled by a filter. According to a standard of the International Telecommunication Union, a channel spacing is 0.8 nm or 0.4 nm, or even narrower. Such a narrow channel spacing has a higher requirement on tuning accuracy and a filter feature of a tunable microring resonator. Otherwise, optical signals of a plurality of channels may be simultaneously downloaded or uploaded within an operating spectral bandwidth, and consequently severe channel crosstalk is caused. In addition, to enable a channel to be flexibly deployed in an entire operating band (for example, a C band or an L band), a tuning range of the microring resonator needs to be large enough to cover the entire band. Otherwise, free uploading and downloading of all channels in the WDM system cannot be implemented. For a resonant component having a periodic filter feature, and in particular, when the filter feature of the microring resonator presents a periodic comb spectrum, the tuning range is usually limited by a free spectral range (FSR) because the resonant wavelength of the microring resonator meets a feature equation: $FSR=\lambda_{m+1}-\lambda_m=\lambda_m^2/n_g L$, where m is a longitudinal mode order of a mode, $\lambda_m$ is a resonant wavelength of an $m^{th}$ order longitudinal mode of the microring resonator, $\lambda_{m+1}$ is a resonant wavelength of an $(m+1)^{th}$ order longitudinal mode of the microring resonator, $n_g$ is a group refractive index of the mode, and L is a perimeter of the microring resonator. To increase the tuning range, the free spectral range FSR of the microring resonator needs to be as large as possible. Currently, there are two main methods to extend the FSR. A first method is to reduce a radius or a perimeter of the microring resonator. It can be learned, according to the feature equation of the microring resonator, that the free spectral range FSR extends as the perimeter L decreases. However, in this method, not only processing difficulty is increased, but also tuning difficulty is increased, and a very high requirement on an external thermal field or an external electric field is imposed for a thermo-optical tuning temperature or electro-optic tuning power, and consequently thermal stability of a component is poor. The other method is to use a cursor effect between microrings with different radiuses to extend the FSR and reduce a passband spectrum side lobe. However, although this method reduces a thermo-optical tuning temperature or electro-optic tuning power, driving control of a plurality of microring resonators is relatively complex.

FIG. 1 is a microring resonator with a wide FSR. The microring resonator is a microring that has a radius of 2.75 μm and that is based on an SOI platform. The microring includes three ports: an input port, a throughput port, and a drop port. An optical signal that conforms to a resonant wavelength of the microring in a channel spectrum and that is input at the input port is coupled to the microring and is output from the drop port, and an optical signal that does not conform to the resonant wavelength of the microring is not coupled to the microring and is directly output from the throughput port.

FIG. 2 is a spectrogram of the microring resonator. It can be learned that the FSR is approximately 33.4 nm, and a 3 dB spectral bandwidth is 25 GHz. Therefore, it can be learned that a compact microring resonator can implement an operating bandwidth of a C band with an FSR close to 35 nm, so that free uploading or downloading of all channels of the C band in the WDM system can be implemented.

FIG. 3 is a thermo-optical tuning optical filter of a cascaded microring. A waveguide is designed as a ridge waveguide, a width is 0.4 μm, an inner ridge height is 0.34 μm, and a flat region height is 0.1 μm. At the wavelength of 1550 nm, an effective refractive index is 2.83. To improve tuning precision, if a radius R1 of a microring 1 is selected to be 48 μm, FSR1=2.8 nm. If a radius R2 of a microring 2 is 50 μm, FSR2=2.7 nm. FSR=FSR1−FSR2=2.8−2.7=0.1 nm, and a cursor effect of the cascaded microring resonator is shown in FIG. 4. Initial alignment is started from a wavelength $\lambda_{00}$. Assuming that alignment is performed again at a wavelength ($\lambda_{00}+\Delta\lambda_{max}$) after the microring 1 passes through N resonant peaks and the microring 2 passes through (N+1) resonant peaks, that is, FSR1×N=FSR2×(N+1), it can be learned that N=27. Therefore, a maximum wavelength tuning range is: $\Delta\lambda_{max}$=FSR1×27=75.6 nm. If maximum wavelength tuning is implemented by controlling to heat the microring 2, a tuning wavelength of the microring 2 needs to be moved: FSR×N=2.7 nm, (N+1=28) discrete alignment wavelengths may be obtained in total, and a spacing between these discrete alignment wavelengths is FSR1=2.8 nm. If the microring 1 is controlled to be heated, a total moving amount of the resonant wavelength is 2.7 nm, each moving step is 0.1 nm, and 27 comb spectrums may be obtained in total. For each fixed comb spectrum, 28 discrete alignment wavelengths may be obtained by heating the microring 2. Therefore, if the microring 1 and the microring 2 are simultaneously heated, (M=27×28=756) discrete wavelengths can be obtained in total, and a spacing between adjacent wavelength is: $\Delta\lambda_{max}$/756=0.1 nm.

It can be learned from the above that, in the first microring resonator control method, a wider resonant wavelength tuning range of a single microring indicates greater tuning difficulty, and a very high requirement is imposed on the thermo-optical tuning temperature or electro-optic tuning power. Consequently, thermal stability of the component is poor. In addition, a smaller size of a unit microring indicates a higher requirement on a processing technology. In the second microring resonator control method, it is complex to control double microring resonators. In other words, there is no simple microring resonator control method with low drive power in the prior art.

SUMMARY

Embodiments of the present invention provide a microring resonator control method and apparatus, so that drive power is low and control is simple.

According to one aspect, a microring resonator control method is provided, and the method includes: receiving an instruction, where the instruction is used to configure an operating wavelength of a microring resonator, the operating wavelength is a specified uploading or downloading wavelength of the microring resonator, and the operating wavelength is one of N channel wavelengths of a channel spectrum; determining whether the operating wavelength of the microring resonator is less than or equal to a center wavelength of the channel spectrum; and when the operating wavelength of the microring resonator is less than or equal to the center wavelength of the channel spectrum, configuring thermode power of the microring resonator based on a spacing between the operating wavelength and a first wavelength, where the first wavelength is a wavelength that is in resonant wavelengths of the microring resonator and that is less than and closest to a first channel wavelength; or when the operating wavelength of the microring resonator is greater than the center wavelength of the channel spectrum, configuring thermode power of the microring resonator based on a spacing between the operating wavelength and a second wavelength, where the second wavelength is a wavelength that is in resonant wavelengths of the microring resonator and that is greater than and closest to a first wavelength.

The channel wavelengths in the channel spectrum are usually arranged in ascending order. When N is an even number, the center wavelength may be selected to be an $(N/2)^{th}$ channel wavelength. When N is an odd number, the center wavelength may be selected to be an $((N+1)/2)^{th}$ channel wavelength or an $((N−1)/2)^{th}$ channel wavelength. The first channel wavelength may be selected to be a channel wavelength ranked first in the channel spectrum, namely, a shortest channel wavelength.

According to another aspect, the present invention provides a microring resonator control apparatus, and the apparatus may implement a function executed by a controlling party in the foregoing method example. The function may be implemented by hardware, or may be implemented by hardware by executing corresponding software. The hardware or software includes one or more units or modules corresponding to the functions.

In a possible design, the apparatus is applied to a computer system, and the computer system includes a processor. The processor is configured to support the apparatus in performing a corresponding function in the foregoing method. The computer system may further include a memory. The memory is configured to be coupled to the processor, and store a necessary program instruction and necessary data of the apparatus.

According to still another aspect, the present invention provides a computer storage medium, configured to store a computer software instruction used by the foregoing microring resonator control apparatus, and the computer software instruction includes a program designed for performing the method of the foregoing aspects.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings and the embodiments of the present invention.

The ordinal numbers such as "first" and "second" mentioned in the embodiments of the present invention shall only serve the purpose of differentiation unless the numbers definitely indicate a sequence according to the context.

Currently, there are two main methods to extend an FSR. A first method is to reduce a radius or a perimeter of a microring resonator. It can be learned, according to a feature equation of the microring resonator, that the free spectral range FSR extends as the perimeter L decreases. However, in this method, not only processing difficulty is increased, but also tuning difficulty is increased, and a very high requirement is imposed on a thermo-optical tuning temperature. Consequently, thermal stability of a component is poor. The other method is to use a cursor effect between microrings with different radiuses to extend the FSR and reduce a passband spectrum side lobe. However, although this method reduces a thermo-optical tuning temperature or electro-optic tuning power, driving control of a plurality of microring resonators is relatively complex. The present invention designs a dual-wavelength operation control solution for a single microring resonator, thereby implement low drive power, simple control, and a wide tuning range.

Figure 1:
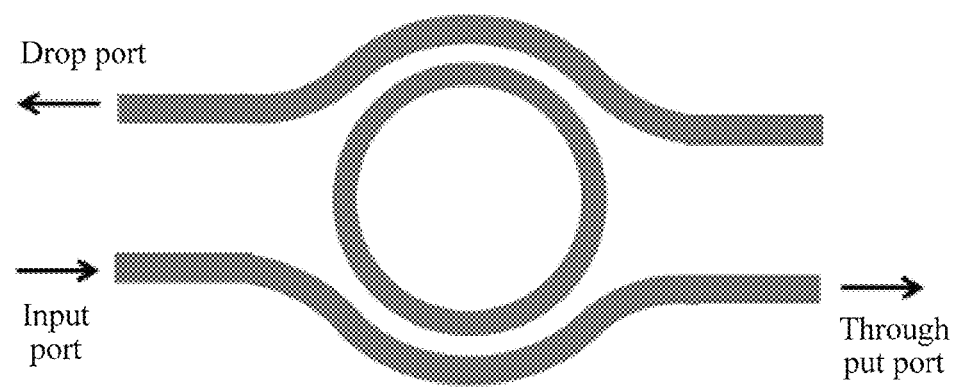
FIG. 1 is a schematic structural diagram of a microring resonator with a wide FSR.
Figure 2:
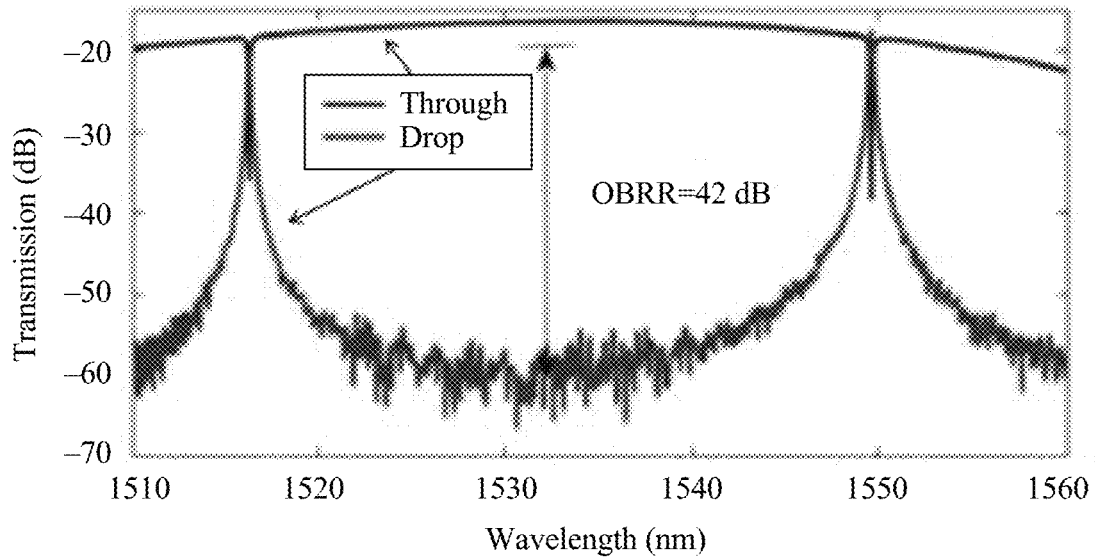
FIG. 2 is a spectrogram of a microring resonator shown in FIG. 1.
Figure 3:
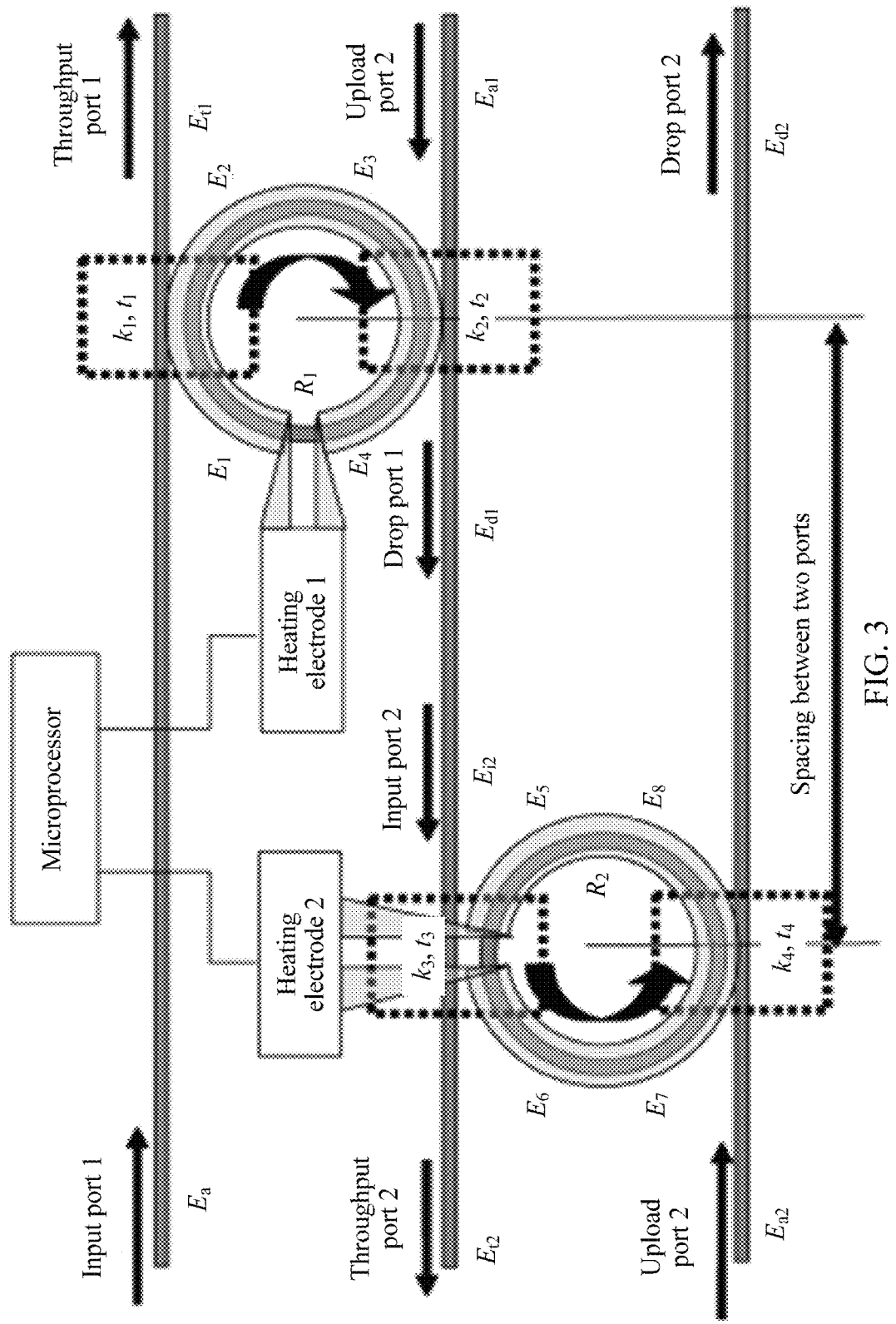
FIG. 3 is a schematic structural diagram of a thermo-optical tuning optical filter of a cascaded microring.
Figure 4:
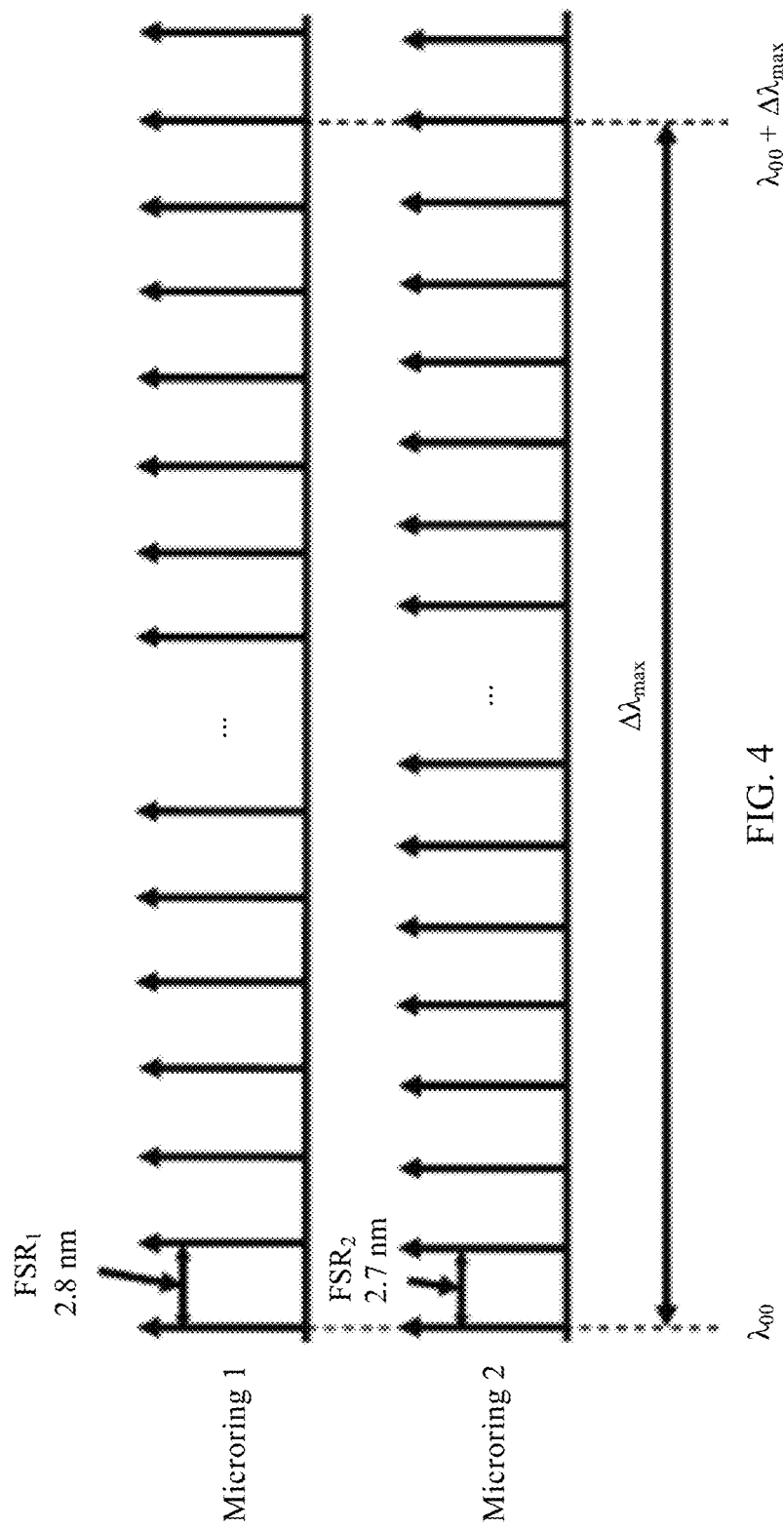
FIG. 4 is a schematic diagram of a cursor effect of a cascaded microring resonator.
Figure 5:
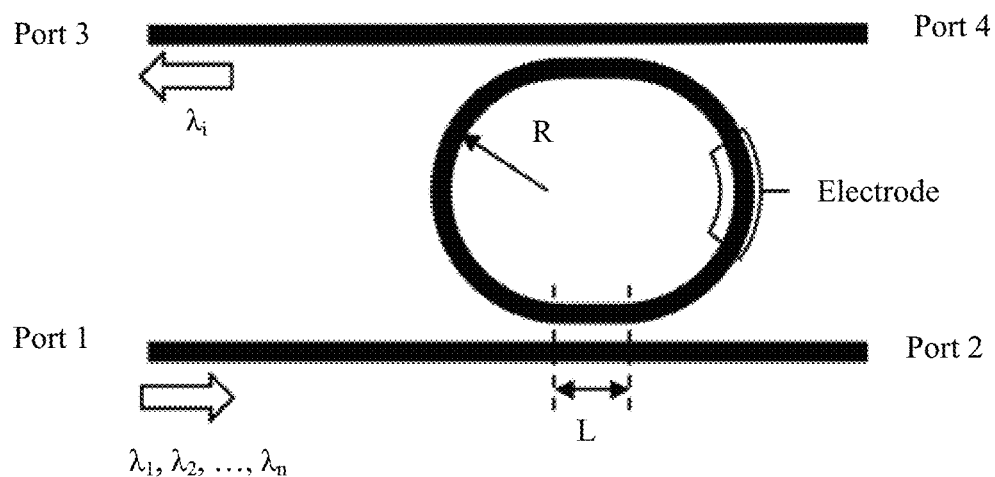
FIG. 5 is a schematic structural diagram of a typical microring resonator.

FIG. 5 is a typical microring resonator. The microring resonator includes four ports in total: a port 1, a port 2, a port 3, and a port 4. When a signal is input from the port 1, for an output spectrum of the port 3, refer to a periodic comb filter spectral line shown below FIG. 6. When a thermode is applied to a microring resonant cavity, that is, when the microring resonant cavity is heated by using an electrode shown in FIG. 5, a refractive index of the microring resonant cavity changes, and a resonant wavelength accordingly changes. When a wavelength division multiplexing optical signal is input from the port 1, if an FSR of the microring resonator meets the following design equation: $FSR=(N+M+1)/2\times\Delta\lambda$, where N is a quantity of channels, M is any non-negative positive integer, such as 0, 1, or 2, and $\Delta\lambda$ is a spacing between adjacent channels on the output spectrum, by selecting an appropriate value of M, the FSR may be less than a total spectral bandwidth of N optical channels, and all remaining resonant wavelengths are between any two optical channel wavelengths when one of resonant wavelengths is aligned with a center wavelength of an optical channel. For example, when a radius R of a silicon-based microring resonant cavity ranges from 5 μm to 6 μm, a coupling region waveguide length is 2 μm, an optical waveguide width is 500 nm, and a height is 220 nm, FSR=16.4 nm. For a dense wavelength division multiplexing system, if N=40, $\Delta\lambda$=0.8 nm, the foregoing design equation is met when M=0. A person skilled in the art can understand that FIG. 5 is only an example of the microring resonator, and is not used to limit the microring resonator. The microring resonator control method provided in this embodiment of the present invention may be applied to a scenario of controlling any microring resonator of a specific structure.

Figure 6:
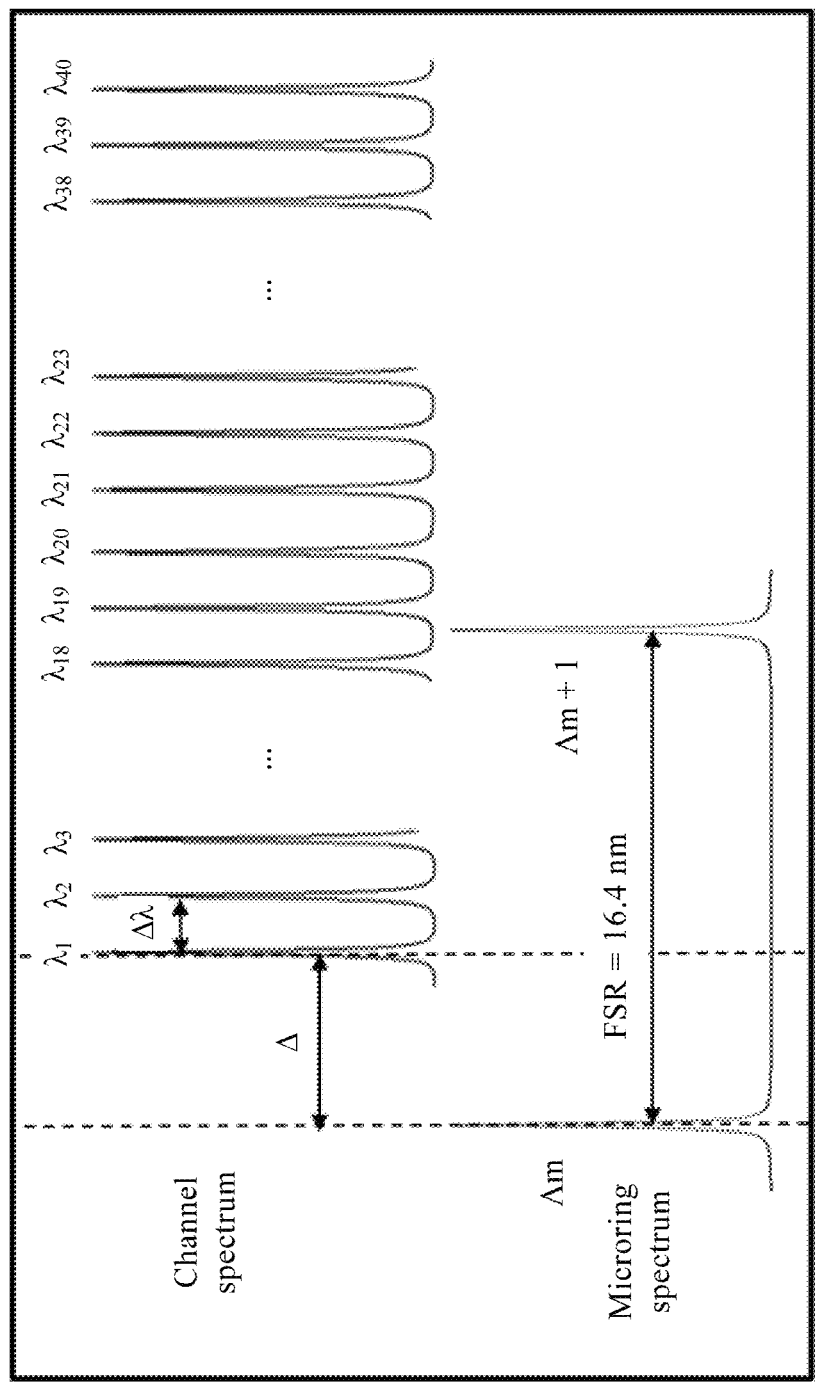
FIG. 6 is an operating principle diagram of a control solution according to an embodiment of the present invention.

FIG. 6 is an operating principle diagram of a control solution according to the present invention. By designing an appropriate radius of the microring resonator, a resonant wavelength of an $m^{th}$ order longitudinal mode may be less than a first channel wavelength. In other words, $\lambda_1-\Lambda m=\Delta$, where $\Delta$ is greater than a variation of a resonant wavelength of a microring caused by a process error.

Figure 7:
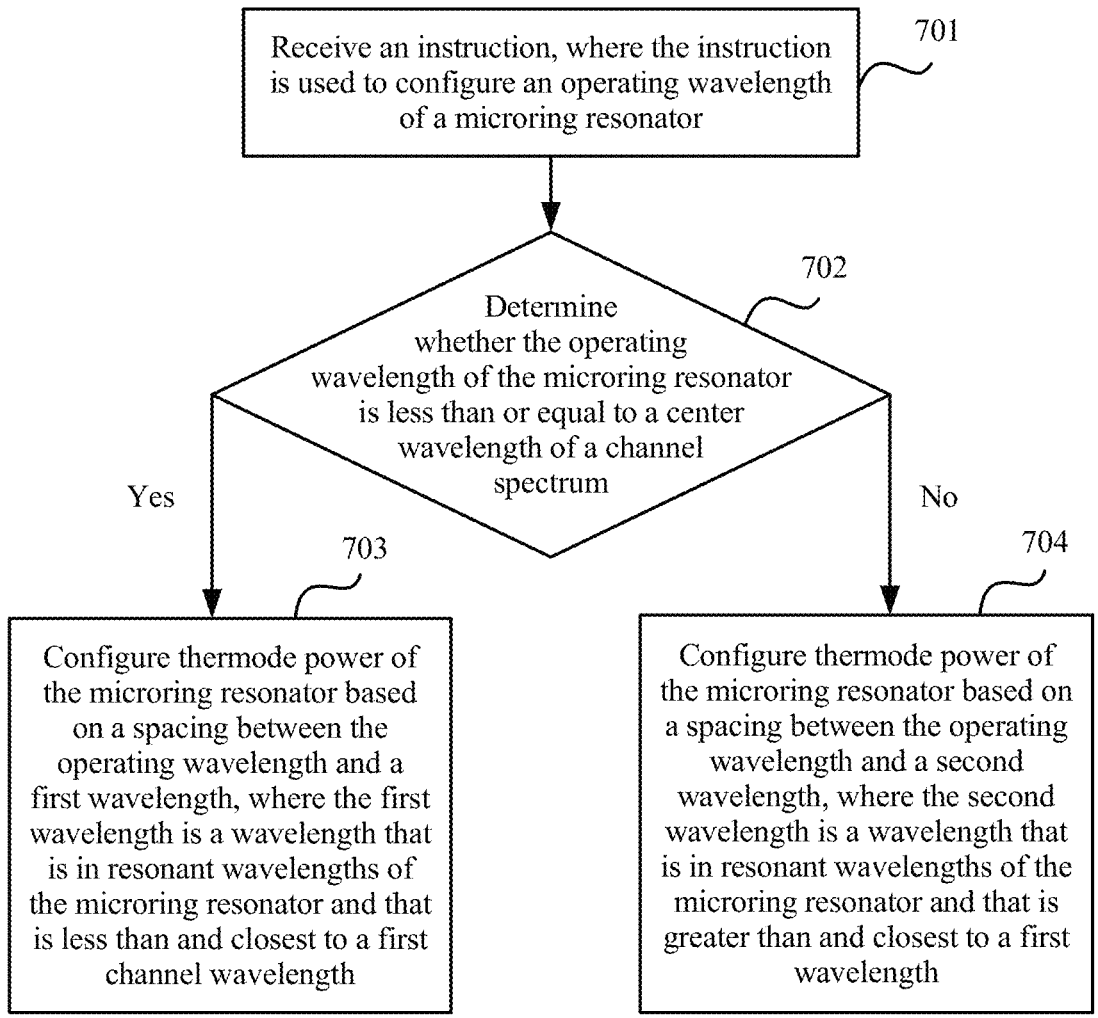
FIG. 7 is a flowchart of a microring resonator control method according to an embodiment of the present invention.

FIG. 7 is a flowchart of a microring resonator control method according to an embodiment of the present invention. The method may be executed by a processor in a computer system, and the method includes the following steps.

Step 701: Receive an instruction, where the instruction is used to configure an operating wavelength of a microring resonator.

The instruction may be an instruction sent based on instruction information of a user, or may be an instruction sent based on pre-configuration information. The instruction may be specifically used to configure the operating wavelength of the microring resonator as any specified channel wavelength in N channel wavelengths of a channel spectrum.

Step 702: Determine whether the operating wavelength of the microring resonator is less than or equal to a center wavelength of a channel spectrum.

The channel wavelengths in the channel spectrum are usually arranged in ascending order. When N is an even number, the center wavelength may be selected to be an $(N/2)^{th}$ channel wavelength. When N is an odd number, the center wavelength may be selected to be an $((N+1)/2)^{th}$ channel wavelength or an $((N-1)/2)^{th}$ channel wavelength.

Step 703: When the operating wavelength of the microring resonator is less than or equal to the center wavelength of the channel spectrum, configure thermode power of the microring resonator based on a spacing between the operating wavelength and a first wavelength, where the first wavelength is a wavelength that is in resonant wavelengths of the microring resonator and that is less than and closest to a first channel wavelength.

In an example, the first channel wavelength may be selected to be a channel wavelength ranked first in the channel spectrum, namely, a shortest channel wavelength.

The channel wavelengths in the channel spectrum may be sequentially numbered in ascending order of the wavelengths, and the shortest wavelength in the channel spectrum is referred to as the first channel wavelength.

In an example, the thermode power of the microring resonator is determined by using a formula $P=(i-1)\times\Delta P+P0$, where P is the thermode power of the microring resonator; i is a sequence number of the operating wavelength in the channel spectrum, and adjacent channels in the channel spectrum have a same channel spacing; $\Delta P$ is channel spacing drive power of the microring resonator, and the channel spacing drive power is thermode power required by the microring resonator to tune a channel spacing; and P0 is initialization drive power of the microring resonator, and the initialization drive power is thermode power required for tuning the first wavelength of the microring resonator to the first channel wavelength.

Step 704: When the operating wavelength of the microring resonator is greater than the center wavelength of the channel spectrum, configure thermode power of the microring resonator based on a spacing between the operating wavelength and a second wavelength, where the second wavelength is a wavelength that is in resonant wavelengths of the microring resonator and that is greater than and closest to a first wavelength.

In an example, the thermode power of the microring resonator is determined by using a formula $P=(i-N/2-1.5)\times \Delta P+P0$, where P is the thermode power of the microring resonator; i is a sequence number of the operating wavelength in the channel spectrum, and adjacent channels in the channel spectrum have a same channel spacing; N is a quantity of channel wavelengths in the channel spectrum; $\Delta P$ is channel spacing drive power of the microring resonator, and the channel spacing drive power is thermode power required by the microring resonator to tune a channel spacing; and P0 is initialization drive power of the microring resonator, and the initialization drive power is thermode power required for tuning the first wavelength of the microring resonator to the first channel wavelength.

In an example, the initialization drive power of the microring resonator may be determined in the following manner: setting the thermode power of the microring resonator to 0, and inputting only an optical signal of the first channel wavelength, so as to test the initialization drive power of the microring resonator; and gradually increasing the thermode power of the microring resonator, and when a photocurrent of the microring resonator reaches a first maximum value, determining the thermode power of the microring resonator as the initialization drive power of the microring resonator.

In an example, the channel spacing drive power of the microring resonator may be determined in the following manner: setting the thermode power of the microring resonator to 0, and inputting only optical signals of the first channel wavelength and a second channel wavelength, so as to test the channel spacing drive power of the microring resonator; configuring the thermode power of the microring resonator to the initialization drive power of the microring resonator; and gradually increasing the thermode power of the microring resonator, and when the photocurrent of the microring resonator reaches a second maximum value, determining a difference between the thermode power of the microring resonator and the initialization drive power of the microring resonator as the channel spacing drive power of the microring resonator.

The channel wavelengths in the channel spectrum are usually arranged in ascending order. The first channel wavelength may be selected to be a channel wavelength ranked first in the channel spectrum, namely, a shortest channel wavelength. The second channel wavelength may be selected to be a channel wavelength ranked second in the channel spectrum, namely, a second shortest channel wavelength.

In addition, after step 703 or step 704, the thermode power of the microring resonator may be further adjusted, and an amplitude is less than the channel spacing drive power of the microring resonator, so that a monitor photocurrent of the microring resonator maintains a maximum value. For example, a monitor photocurrent of a detector connected to the microring resonator maintains a maximum value.

In this embodiment of the present invention, a dual-wavelength operation control solution for a single microring resonator is provided. Different resonant wavelengths are used as a reference for tuning based on a relationship between values of the operating wavelength and the center wavelength of the channel spectrum, thereby implementing low drive power, simple control, and a wide tuning range.

Figure 8:
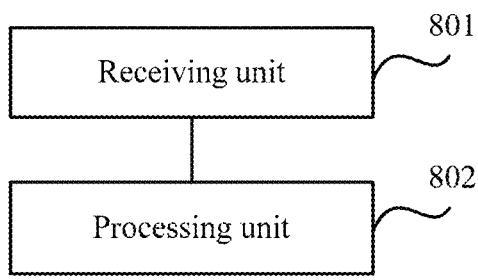
FIG. 8 is a structural diagram of a microring resonator control apparatus according to an embodiment of the present invention.

FIG. 8 is a structural diagram of a microring resonator control apparatus according to an embodiment of the present invention. The apparatus is configured to perform the microring resonator control method provided in the embodiment of the present invention. The apparatus includes a receiving unit 801 and a processing unit 802.

The receiving unit 801 is configured to receive an instruction, where the instruction is used to configure an operating wavelength of a microring resonator, and the operating wavelength of the microring resonator is any specified channel wavelength in N channel wavelengths of a channel spectrum.

The receiving unit 801 may be specifically a component in a computer system such as a touchscreen or a keyboard, configured to receive instruction information of a user. Alternatively, the receiving unit 801 may be a communications interface in a computer system, configured to receive instruction information sent by another device.

The processing unit 802 is configured to: determine whether the operating wavelength of the microring resonator received by the receiving unit 801 is less than or equal to a center wavelength of the channel spectrum; and when the operating wavelength of the microring resonator is less than or equal to the center wavelength of the channel spectrum, configure thermode power of the microring resonator based on a spacing between the operating wavelength and a first wavelength, where the first wavelength is a wavelength that is in resonant wavelengths of the microring resonator and that is less than and closest to a first channel wavelength of the channel spectrum; or when the operating wavelength of the microring resonator is greater than the center wavelength of the channel spectrum, configure thermode power of the microring resonator based on a spacing between the operating wavelength and a second wavelength, where the second wavelength is a wavelength that is in resonant wavelengths of the microring resonator and that is greater than and closest to a first wavelength.

The processing unit 802 may be specifically a component in the computer system such as a processor.

In an example, the processing unit 802 is specifically configured to: when the operating wavelength of the microring resonator is less than or equal to the center wavelength of the channel spectrum, determine the thermode power of the microring resonator by using a formula $P=(i-1)\times \Delta P+P0$, where P is the thermode power of the microring resonator; i is a sequence number of the operating wavelength in the channel spectrum, and adjacent channels in the channel spectrum have a same channel spacing; $\Delta P$ is channel spacing drive power of the microring resonator, and the channel spacing drive power is thermode power required by the microring resonator to tune a channel spacing; and P0 is initialization drive power of the microring resonator, and the initialization drive power is thermode power required for tuning the first wavelength of the microring resonator to the first channel wavelength.

In an example, the processing unit 802 is specifically configured to: when the operating wavelength of the microring resonator is greater than the center wavelength of the channel spectrum, determine the thermode power of the microring resonator by using a formula $P=(i-N/2-1.5)\times\Delta P+P0$, where P is the thermode power of the microring resonator; i is a sequence number of the operating wavelength in the channel spectrum, and adjacent channels in the channel spectrum have a same channel spacing; N is a quantity of channel wavelengths in the channel spectrum; $\Delta P$ is channel spacing drive power of the microring resonator, and the channel spacing drive power is thermode power required by the microring resonator to tune a channel spacing; and P0 is initialization drive power of the microring resonator, and the initialization drive power is thermode power required for tuning the first wavelength of the microring resonator to the first channel wavelength.

In an example, the processing unit 802 is further configured to: set the thermode power of the microring resonator to 0, and input only an optical signal of the first channel wavelength, so as to test the initialization drive power of the microring resonator; and gradually increase the thermode power of the microring resonator, and when a photocurrent of the microring resonator reaches a first maximum value, determine the thermode power of the microring resonator as the initialization drive power of the microring resonator.

In an example, the processing unit 802 is further configured to: set the thermode power of the microring resonator to 0, and input only optical signals of the first channel wavelength and a second channel wavelength, so as to test the channel spacing drive power of the microring resonator; configure the thermode power of the microring resonator to the initialization drive power of the microring resonator; and gradually increase the thermode power of the microring resonator, and when a photocurrent of the microring resonator reaches a second maximum value, determine a difference between the thermode power of the microring resonator and the initialization drive power of the microring resonator as the channel spacing drive power of the microring resonator.

In an example, the processing unit 802 is further configured to: after configuring the thermode power of the microring resonator based on the spacing between the operating wavelength and the first wavelength, or after configuring the thermode power of the microring resonator based on the spacing between the operating wavelength and the second wavelength, adjust the thermode power of the microring resonator, where an adjustment amplitude is less than the channel spacing drive power of the microring resonator, so that a monitor photocurrent of the microring resonator maintains a maximum value.

Figure 9:
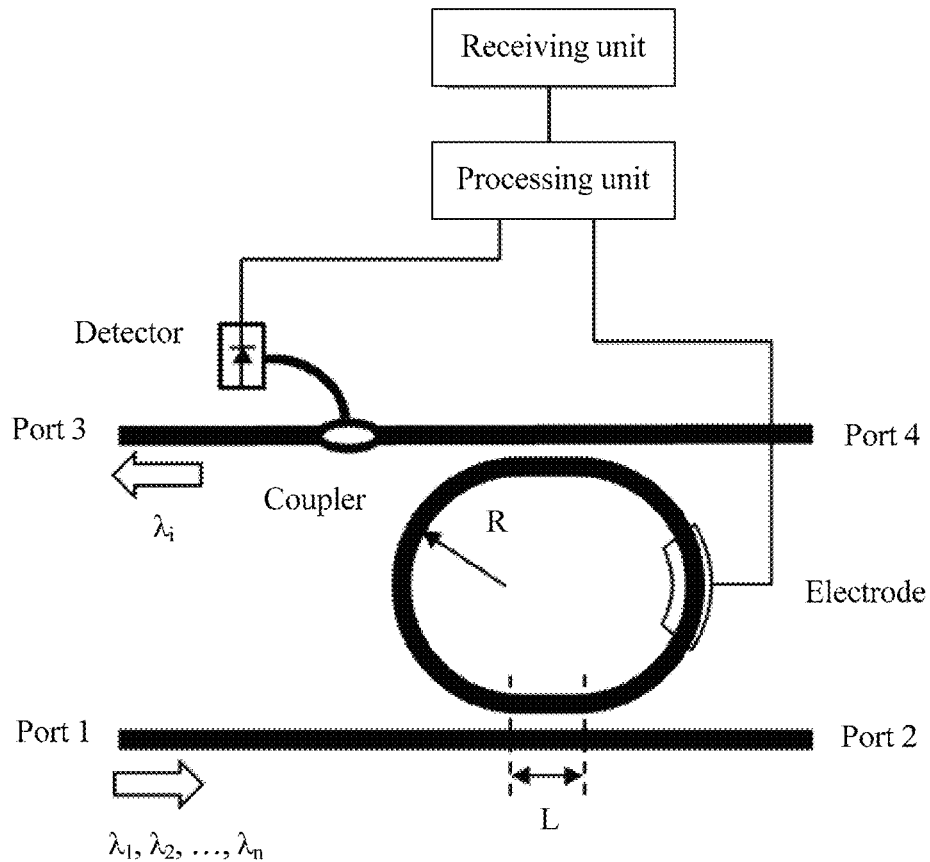
FIG. 9 is a schematic structural diagram of a wavelength-selective optical switch according to an embodiment of the present invention.

FIG. 9 is a wavelength-selective optical switch and a control apparatus according to an embodiment of the present invention. The wavelength-selective switch includes one microring resonator. The microring resonator includes two waveguides and an intermediate microring. The microring resonator includes four ports in total: a port 1, a port 2, a port 3, and a port 4. The port 1 serves as an input port, and the port 3 serves as an output port. The output port is connected to a coupler, the coupler is connected to a detector, the detector is connected to a processing unit, the microring is connected to an electrode, the electrode is connected to the processing unit, and the processing unit is connected to a receiving unit. When an optical signal is input from the port 1, the detector is configured to detect light intensity of the port 3 of the microring. The electrode is connected to the microring, and is configured to control a resonant wavelength of the microring. After receiving a control signal of the receiving unit and after performing internal processing, the processing unit applies specified power to the electrode to modulate the resonant wavelength of the microring. The processing unit receives a feedback signal of the detector, and applies, after performing internal processing, specified fine adjustment power to the electrode to maintain a maximum value of a photocurrent of the detector. According to the microring resonator control method provided in this embodiment of the present invention, an output wavelength of the port 3 is configured. In other words, the port 3 of the wavelength-selective optical switch can output a specified wavelength.

For the wavelength-selective optical switch shown in FIG. 9, the following describes the microring resonator control method by using a specific embodiment, and a part that is the same as that in the foregoing method embodiment is not described herein again.

Figure 10:
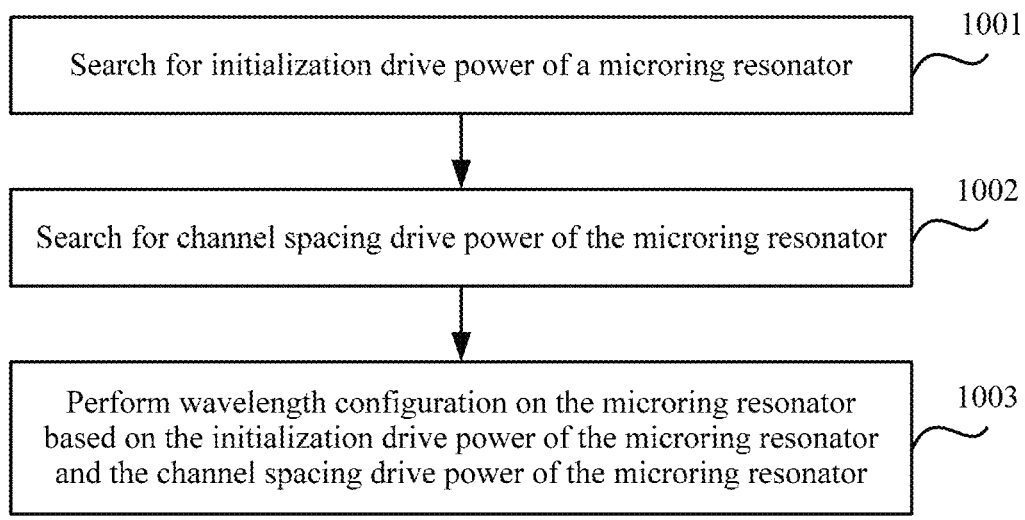
FIG. 10 is a flowchart of another microring resonator control method according to an embodiment of the present invention.

FIG. 10 is a flowchart of another microring resonator control method according to an embodiment of the present invention. The method is used to control the wavelength-selective optical switch shown in FIG. 9, and the method includes the following steps:

Step 1001: Search for initialization drive power of a microring resonator.

Step 1002: Search for channel spacing drive power of the microring resonator.

Step 1003: Perform wavelength configuration on the microring resonator based on the initialization drive power of the microring resonator and the channel spacing drive power of the microring resonator.

Figure 11:
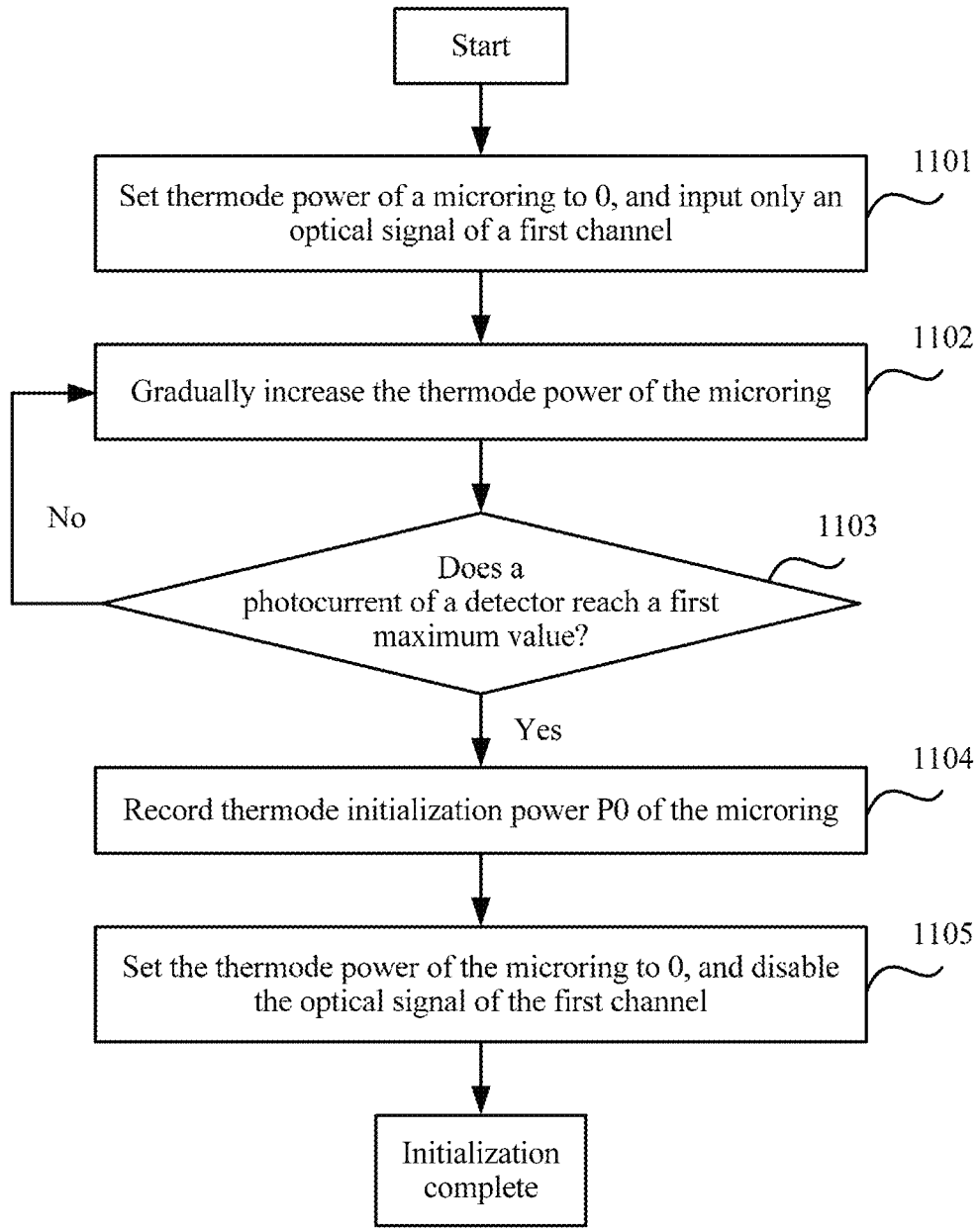
FIG. 11 is a flowchart of a method for searching for initialization drive power of a microring resonator according to an embodiment of the present invention.

FIG. 11 is a flowchart of a method for searching for initialization drive power of a microring resonator according to an embodiment of the present invention. The method is based on the microring resonator control method shown in FIG. 10, and the method includes the following steps.

Step 1101: Set thermode power of a microring to 0, and input only an optical signal of a first channel.

The optical signal of the first channel is an optical signal of a first channel wavelength.

Step 1102: Gradually increase the thermode power of the microring.

Step 1103: Determine whether a photocurrent of a detector reaches a first maximum value.

If a determining result is yes, step 1104 is performed; or if a determining result is no, step 1102 is performed.

Step 1104: Record thermode initialization power P0 of the microring.

Step 1105: Set the thermode power of the microring to 0, and disable the optical signal of the first channel.

Figure 12:
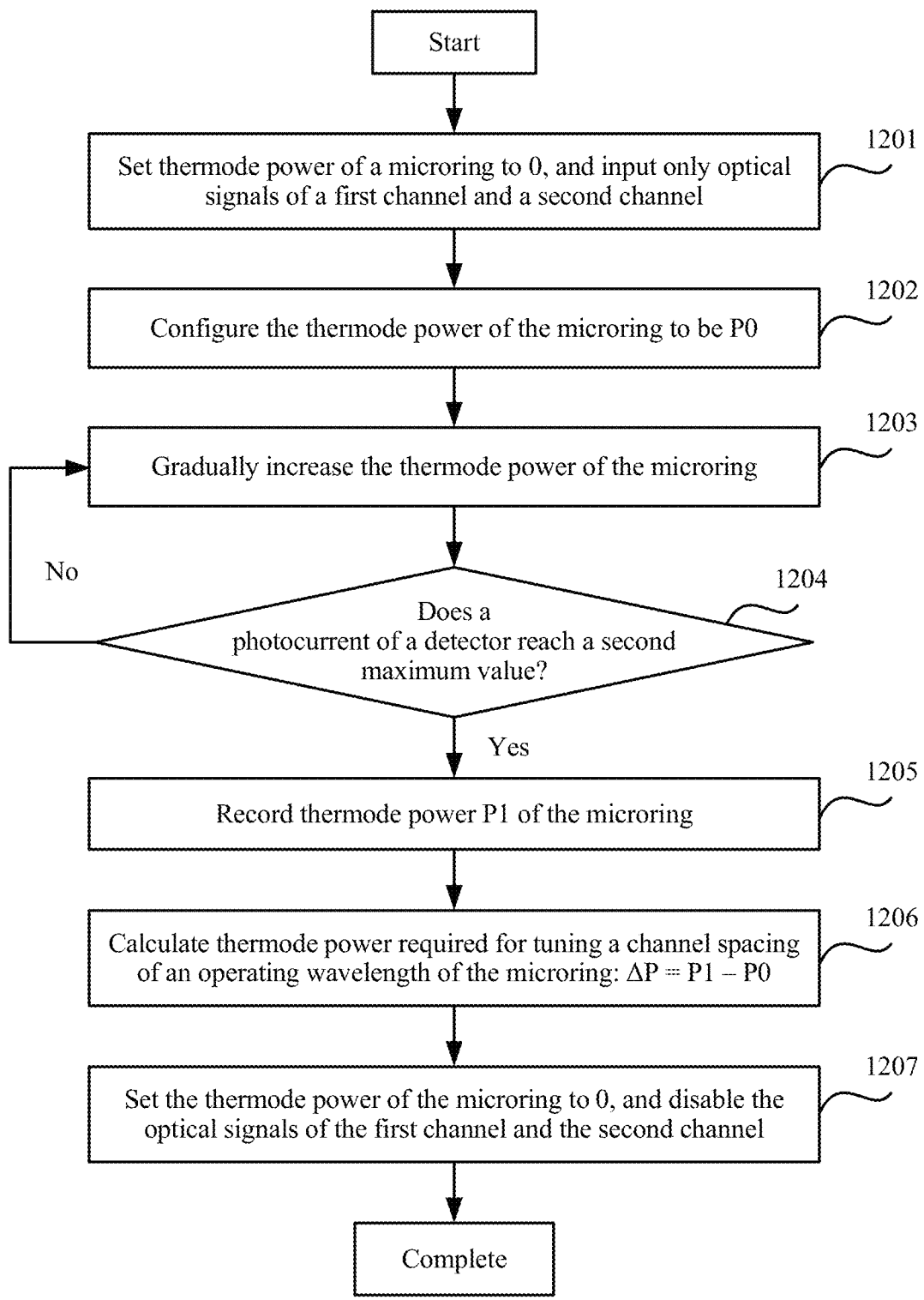
FIG. 12 is a flowchart of a method for searching for channel spacing drive power of a microring resonator according to an embodiment of the present invention.

FIG. 12 is a flowchart of a method for searching for channel spacing drive power of a microring resonator according to an embodiment of the present invention. The method is based on the microring resonator control method shown in FIG. 10, and the method includes the following steps.

Step 1201: Set thermode power of a microring to 0, and input only optical signals of a first channel and a second channel.

An optical signal of the first channel is an optical signal of a first channel wavelength, and an optical signal of the second channel is an optical signal of a second channel wavelength.

Step 1202: Configure the thermode power of the microring to be P0.

Step 1203: Gradually increase the thermode power of the microring.

Step 1204: Determine whether a photocurrent of a detector reaches a second maximum value.

If a determining result is yes, step 1205 is performed; or if a determining result is no, step 1203 is performed.

Step 1205: Record thermode initialization power P1 of the microring.

Step 1206: Calculate thermode power required for tuning a channel spacing of an operating wavelength of the microring: $\Delta P = P1 - P0$.

Step 1207: Set the thermode power of the microring to 0, and disable the optical signals of the first channel and the second channel.

Figure 13:
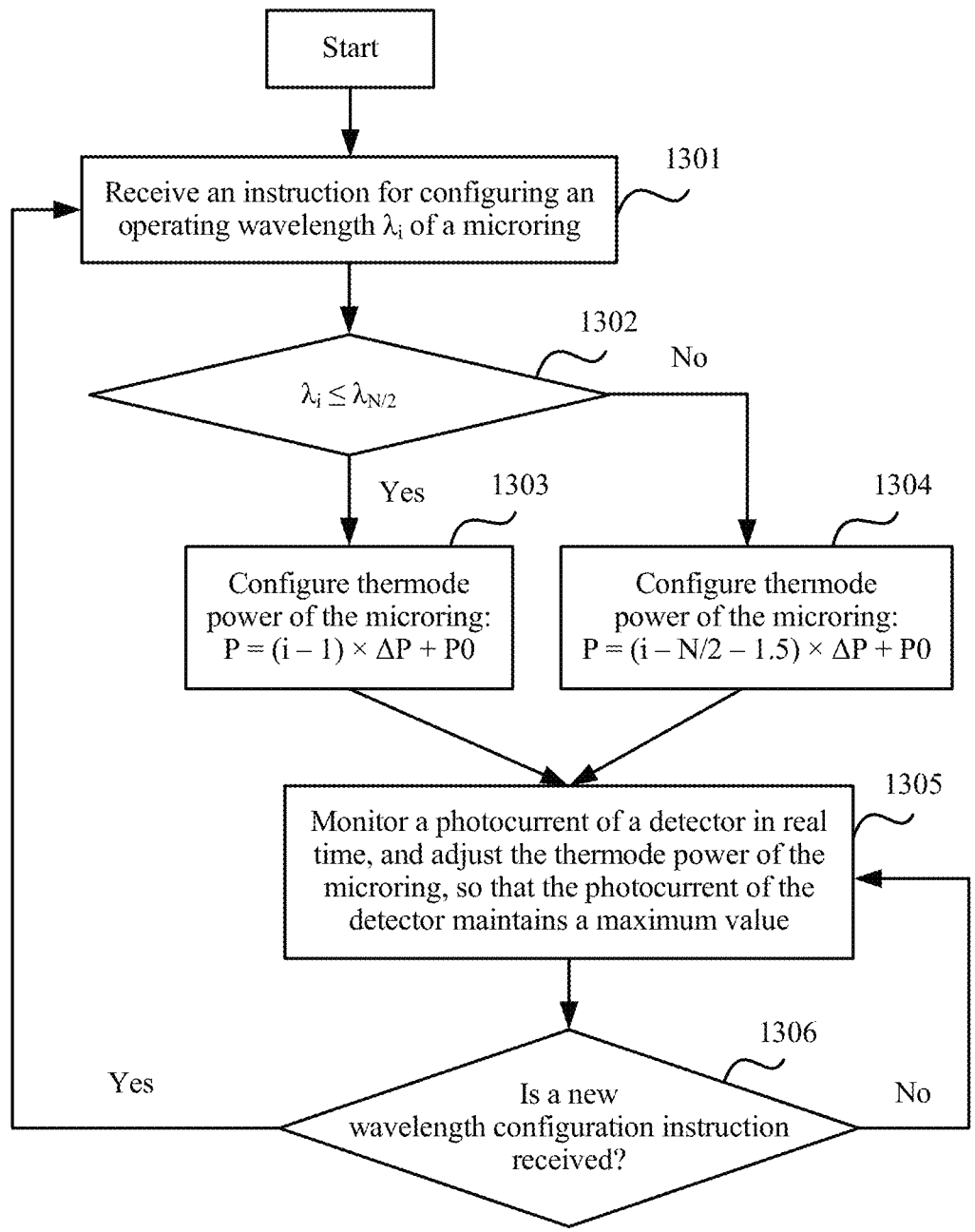
FIG. 13 is a flowchart of a wavelength configuration method according to an embodiment of the present invention.

FIG. 13 is a flowchart of a wavelength configuration method according to an embodiment of the present invention. The method is based on the microring resonator control method shown in FIG. 10, and the method includes the following steps.

Step 1301: Receive an instruction for configuring an operating wavelength $\lambda_i$ of a microring.

Step 1302: Determine whether the operating wavelength $\lambda_i$ of the microring is less than or equal to a center wavelength of a channel spectrum.

Specifically, it may be determined whether an inequality $\lambda_i \leq \lambda_{N/2}$ is valid.

If a determining result is yes, step 1303 is performed; or if a determining result is no, step 1304 is performed.

Step 1303: Configure thermode power of the microring: $P = (i-1) \times \Delta P + P0$.

Step 1304: Configure thermode power of the microring: $P = (i - N/2 - 1.5) \times \Delta P + P0$.

Step 1305: Monitor a photocurrent of a detector in real time, and adjust the thermode power of the microring, so that the photocurrent of the detector maintains a maximum value.

Step 1306: Determine whether a new wavelength configuration instruction is received.

If a determining result is yes, step 1301 is performed; or if a determining result is no, step 1305 is performed.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

A person of ordinary skill in the art may understand that all or a part of the steps in the foregoing methods of the embodiments may be implemented by a program instructing a processor. The program may be stored in a computer readable storage medium. The storage medium may be a non-transitory medium, such as a random access memory, a read-only memory, a flash memory, a hard disk, a solid-state drive, a magnetic tape, a floppy disk, an optical disc, or any combination thereof. The foregoing descriptions are merely specific example implementations of the present invention, but are not intended to limit the protection scope of the present invention.

What is claimed is:

1. A microring resonator control method, wherein the method comprises:
   receiving an instruction, wherein the instruction is used to configure an operating wavelength of a microring resonator, and the operating wavelength of the microring resonator is any specified channel wavelength in N channel wavelengths of a channel spectrum;
   determining whether the operating wavelength of the microring resonator is less than or equal to a center wavelength of the channel spectrum; and
   when the operating wavelength of the microring resonator is less than or equal to the center wavelength of the channel spectrum, configuring thermode power of the microring resonator based on a spacing between the operating wavelength and a first wavelength, wherein the first wavelength is a wavelength that is in resonant wavelengths of the microring resonator and that is less than and closest to a first channel wavelength of the channel spectrum; or when the operating wavelength of the microring resonator is greater than the center wavelength of the channel spectrum, configuring thermode power of the microring resonator based on a spacing between the operating wavelength and a second wavelength, wherein the second wavelength is a wavelength that is in resonant wavelengths of the microring resonator and that is greater than and closest to a first wavelength.

2. The method according to claim 1, wherein the configuring thermode power of the microring resonator based on a spacing between the operating wavelength and a first wavelength comprises:
   determining the thermode power of the microring resonator by using a formula $P = (i-1) \times \Delta P + P0$, wherein
   P is the thermode power of the microring resonator;
   i is a sequence number of the operating wavelength in the channel spectrum, and adjacent channels in the channel spectrum have a same channel spacing;
   $\Delta P$ is channel spacing drive power of the microring resonator, and the channel spacing drive power is thermode power required by the microring resonator to tune a channel spacing; and
   P0 is initialization drive power of the microring resonator, and the initialization drive power is thermode power required for tuning the first wavelength of the microring resonator to the first channel wavelength.

3. The method according to claim 1, wherein the configuring thermode power of the microring resonator based on a spacing between the operating wavelength and a second wavelength comprises:
   determining the thermode power of the microring resonator by using a formula $P = (i - N/2 - 1.5) \times \Delta P + P0$, wherein
   P is the thermode power of the microring resonator;
   i is a sequence number of the operating wavelength in the channel spectrum, and adjacent channels in the channel spectrum have a same channel spacing;
   N is a quantity of channel wavelengths in the channel spectrum;
   $\Delta P$ is channel spacing drive power of the microring resonator, and the channel spacing drive power is thermode power required by the microring resonator to tune a channel spacing; and
   P0 is initialization drive power of the microring resonator, and the initialization drive power is thermode power required for tuning the first wavelength of the microring resonator to the first channel wavelength.

4. The method according to claim 2, wherein before the determining the thermode power of the microring resonator by using a formula $P = (i-1) \times \Delta P + P0$, or before the determining the thermode power of the microring resonator by using a formula $P=(i-N/2-1.5)\times\Delta P+P0$, the method further comprises:

setting the thermode power of the microring resonator to 0, and inputting only an optical signal of the first channel wavelength, so as to test the initialization drive power of the microring resonator; and gradually increasing the thermode power of the microring resonator, and when a photocurrent of the microring resonator reaches a first maximum value, determining the thermode power of the microring resonator as the initialization drive power of the microring resonator.

5. The method according to claim 4, wherein after the determining the thermode power of the microring resonator as the initialization drive power of the microring resonator, the method further comprises:

setting the thermode power of the microring to 0, and disable the optical signal of the first channel.

6. The method according to claim 4, wherein after the determining the thermode power of the microring resonator as the initialization drive power of the microring resonator, the method further comprises:

setting the thermode power of the microring resonator to 0, and inputting only optical signals of the first channel wavelength and a second channel wavelength, so as to test the channel spacing drive power of the microring resonator;

configuring the thermode power of the microring resonator to the initialization drive power of the microring resonator; and gradually increasing the thermode power of the microring resonator, and when the photocurrent of the microring resonator reaches a second maximum value, determining a difference between the thermode power of the microring resonator and the initialization drive power of the microring resonator as the channel spacing drive power of the microring resonator.

7. The method according to claim 6, wherein after the determining a difference between the thermode power of the microring resonator and the initialization drive power of the microring resonator as the channel spacing drive power of the microring resonator, the method further comprises:

setting the thermode power of the microring to 0, and disable the optical signals of the first channel and the second channel.

8. The method according to claim 1, wherein after the configuring thermode power of the microring resonator based on a spacing between the operating wavelength and a first wavelength, or after the configuring thermode power of the microring resonator based on a spacing between the operating wavelength and a second wavelength, the method further comprises:

adjusting the thermode power of the microring resonator, wherein an adjustment amplitude is less than the channel spacing drive power of the microring resonator, so that a monitor photocurrent of the microring resonator maintains a maximum value.

9. A microring resonator control apparatus, wherein the apparatus comprises a receiver and a processor;

the receiver is configured to receive an instruction, wherein the instruction is used to configure an operating wavelength of a microring resonator, and the operating wavelength of the microring resonator is any specified channel wavelength in N channel wavelengths of a channel spectrum; and the processor is configured to determine whether the operating wavelength of the microring resonator received by the receiver is less than or equal to a center wavelength of the channel spectrum, and when the operating wavelength of the microring resonator is less than or equal to the center wavelength of the channel spectrum, configure thermode power of the microring resonator based on a spacing between the operating wavelength and a first wavelength, wherein the first wavelength is a wavelength that is in resonant wavelengths of the microring resonator and that is less than and closest to a first channel wavelength of the channel spectrum, or when the operating wavelength of the microring resonator is greater than the center wavelength of the channel spectrum, configure thermode power of the microring resonator based on a spacing between the operating wavelength and a second wavelength, wherein the second wavelength is a wavelength that is in resonant wavelengths of the microring resonator and that is greater than and closest to the first wavelength.

10. The apparatus according to claim 9, wherein the processor is specifically configured to: when the operating wavelength of the microring resonator is less than or equal to the center wavelength of the channel spectrum, determine the thermode power of the microring resonator by using a formula $P=(i-1)\times\Delta P+P0$, wherein P is the thermode power of the microring resonator; i is a sequence number of the operating wavelength in the channel spectrum, and adjacent channels in the channel spectrum have a same channel spacing; $\Delta P$ is channel spacing drive power of the microring resonator, and the channel spacing drive power is thermode power required by the microring resonator to tune a channel spacing; and P0 is initialization drive power of the microring resonator, and the initialization drive power is thermode power required for tuning the first wavelength of the microring resonator to the first channel wavelength.

11. The apparatus according to claim 9, wherein the processor is specifically configured to: when the operating wavelength of the microring resonator is greater than the center wavelength of the channel spectrum, determine the thermode power of the microring resonator by using a formula $P=(i-N/2-1.5)\times\Delta P+P0$, wherein P is the thermode power of the microring resonator; i is a sequence number of the operating wavelength in the channel spectrum, and adjacent channels in the channel spectrum have a same channel spacing; N is a quantity of channel wavelengths in the channel spectrum; $\Delta P$ is channel spacing drive power of the microring resonator, and the channel spacing drive power is thermode power required by the microring resonator to tune a channel spacing; and P0 is initialization drive power of the microring resonator, and the initialization drive power is thermode power required for tuning the first wavelength of the microring resonator to the first channel wavelength.

12. The apparatus according to claim 10, wherein the processor is further configured to: before determining the thermode power of the microring resonator by using the formula $P=(i-1)\times\Delta P+P0$, or before determining the thermode power of the microring resonator by using the formula $P=(i-N/2-1.5)\times\Delta P+P0$, set the thermode power of the microring resonator to 0, and input only an optical signal of the first channel wavelength, so as to test the initialization drive power of the microring resonator; and gradually increase the thermode power of the microring resonator, and when a photocurrent of the microring resonator reaches a first maximum value, determine the thermode power of the microring resonator as the initialization drive power of the microring resonator.

13. The apparatus according to claim 12, wherein the processor is further configured to: after determining the thermode power of the microring resonator as the initialization drive power of the microring resonator, set the thermode power of the microring to 0, and disable the optical signal of the first channel.

14. The apparatus according to claim 10, wherein the processor is further configured to: after determining the thermode power of the microring resonator as the initialization drive power of the microring resonator, set the thermode power of the microring resonator to 0, and input only optical signals of the first channel wavelength and a second channel wavelength, so as to test the channel spacing drive power of the microring resonator; configure the thermode power of the microring resonator to the initialization drive power of the microring resonator; and gradually increase the thermode power of the microring resonator, and when a photocurrent of the microring resonator reaches a second maximum value, determine a difference between the thermode power of the microring resonator and the initialization drive power of the microring resonator as the channel spacing drive power of the microring resonator.

15. The apparatus according to claim 14, wherein the processor is further configured to: after determining a difference between the thermode power of the microring resonator and the initialization drive power of the microring resonator as the channel spacing drive power of the microring resonator, set the thermode power of the microring to 0, and disable the optical signals of the first channel and the second channel.

16. The apparatus according to claim 9, wherein the processor is further configured to: after configuring the thermode power of the microring resonator based on the spacing between the operating wavelength and the first wavelength, or after configuring the thermode power of the microring resonator based on the spacing between the operating wavelength and the second wavelength, adjust the thermode power of the microring resonator, wherein an adjustment amplitude is less than the channel spacing drive power of the microring resonator, so that a monitor photocurrent of the microring resonator maintains a maximum value.

* * * * *